(12) United States Patent
Nakano et al.

(10) Patent No.: US 10,997,972 B2
(45) Date of Patent: May 4, 2021

(54) OBJECT AUTHENTICATION DEVICE AND OBJECT AUTHENTICATION METHOD

(71) Applicant: HONDA MOTOR CO., LTD., Tokyo (JP)

(72) Inventors: Mikio Nakano, Wako (JP); Tomoyuki Sahata, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 211 days.

(21) Appl. No.: 15/934,322

(22) Filed: Mar. 23, 2018

(65) Prior Publication Data
US 2018/0286398 A1    Oct. 4, 2018

(30) Foreign Application Priority Data

Mar. 29, 2017    (JP) .............................. JP2017-065864

(51) Int. Cl.
| | | |
|---|---|---|
| *G06F 40/56* | (2020.01) | |
| *G10L 25/54* | (2013.01) | |
| *G10L 15/02* | (2006.01) | |
| *G10L 15/16* | (2006.01) | |
| *G10L 15/22* | (2006.01) | |

(Continued)

(52) U.S. Cl.
CPC .............. *G10L 15/22* (2013.01); *G06F 16/50* (2019.01); *G06F 16/5866* (2019.01); *G06K 9/00577* (2013.01); *G06K 9/4676* (2013.01); *G06K 9/6293* (2013.01); *G10L 15/1815* (2013.01); *G10L 15/24* (2013.01); *G10L 25/54* (2013.01); *G10L 15/02* (2013.01); *G10L 15/183* (2013.01); *G10L 25/78* (2013.01)

(58) Field of Classification Search
CPC .............. G06F 16/7837; G06F 3/04842; G06F 16/285; G06F 40/56; G10L 25/54; G10L 15/24; G10L 15/02; G10L 15/16 15/22; G10L 15/24; G10L 15/02; G10L 15/16

USPC .................................................. 704/235, 275
See application file for complete search history.

(56) References Cited

U.S. PATENT DOCUMENTS

| | | | | |
|---|---|---|---|---|
| 9,345,957 | B2 * | 5/2016 | Geisner ................. | G06T 19/006 |
| 2013/0163887 | A1 * | 6/2013 | Nakano ................ | G06K 9/6267 |
| | | | | 382/224 |
| 2014/0249814 | A1 * | 9/2014 | Nakano ................... | G10L 25/54 |
| | | | | 704/235 |

FOREIGN PATENT DOCUMENTS

| | | |
|---|---|---|
| JP | 2013-088906 A | 5/2013 |
| JP | 2014-170295 | 9/2014 |
| JP | 2016-191973 A | 11/2016 |

OTHER PUBLICATIONS

Japanese Notice of Allowance with English translation dated Oct. 2, 2018, 6 pages.

* cited by examiner

*Primary Examiner* — Richemond Dorvil
*Assistant Examiner* — Rodrigo A Chavez
(74) *Attorney, Agent, or Firm* — Rankin, Hill & Clark LLP

(57) ABSTRACT

An object authentication device includes a speech recognition unit configured to obtain candidates for a speech recognition result for an input speech and a likelihood of the speech as a speech likelihood and an image model generation unit configured to obtain image models of a predetermined number of candidates for the speech recognition result in descending order of speech likelihoods, wherein the image model generation unit initially performs retrieval from an image model database storing the image models when the image models for the candidates for the speech recognition result are generated and generates an image model from information acquired from a network if the image model is not stored in the image model database.

3 Claims, 5 Drawing Sheets

(51) Int. Cl.
  *G06K 9/00* (2006.01)
  *G06K 9/46* (2006.01)
  *G06F 16/50* (2019.01)
  *G10L 15/18* (2013.01)
  *G10L 15/24* (2013.01)
  *G06K 9/62* (2006.01)
  *G06F 16/58* (2019.01)
  G10L 15/183 (2013.01)
  G10L 25/78 (2013.01)

FIG. 2

| IMAGE MODEL NAME (OBJECT NAME) | NUMBER OF USES | VALIDITY/INVALIDITY OF SAVING |
|---|---|---|
| STRAWBERRY | 10 | ○ |
| LEMON | 8 | ○ |
| TRUCK | 3 | × |

OBJECT AUTHENTICATION DEVICE AND OBJECT AUTHENTICATION METHOD

CROSS-REFERENCE TO RELATED APPLICATION

Priority is claimed on Japanese Patent Application No. 2017-065864, filed Mar. 29, 2017, the content of which is incorporated herein by reference.

BACKGROUND OF THE INVENTION

Field of the Invention

The present invention relates to an object authentication device and an object authentication method.

Description of Related Art

When a robot performs a task in a home environment, it is necessary to achieve at least an object gripping task of gripping an object indicated by a user. In such a task, for example, the user issues an instruction by speech and the robot performs object authentication on the basis of a speech recognition result of the user's speech. Also, the robot can acquire image information of an object around the robot through an imaging device.

As a system for recognizing such an object, a method of integrating speech information and image information has been proposed (for example, see Y. Ozasa et al., "Disambiguation in Unknown Object Detection by Integrating Image and Speech Recognition Confidences," ACCV, 2012 (hereinafter referred to as Non-Patent Literature 1)). However, in the technology described in Non-Patent Literature 1, both a speech model and an image model are required when object authentication is performed. Although it is easy for the object authentication system to hold such a speech model, it is difficult to actually hold a large number of image models because the file size thereof is large.

Thus, as a system for recognizing an object, technology for recognizing a target object on the basis of speech likelihood and an image likelihood has been disclosed (for example, see Japanese Unexamined Patent Application, First Publication No. 2014-170295 (hereinafter referred to as Patent Literature 1)).

SUMMARY OF THE INVENTION

In the technology disclosed in Patent Literature 1, a target image is read from an image model on the basis of a speech likelihood, and object authentication is performed on the basis of an image likelihood by reading an image from the web when there is no target image in the image model. However, in the technology disclosed in Patent Literature 1, retrieval of an image from the web is likely to be time-consuming and there is a problem of deterioration of an object authentication speed.

An aspect according to the present invention has been made in view of the above-described problems, and an objective of the aspect according to the present invention is to provide an object authentication device and an object authentication method capable of improving an object authentication speed.

In order to achieve the above-described objective, the present invention adopts the following aspects.

(1) According to an aspect of the present invention, an object authentication device includes a speech recognition unit configured to obtain candidates for a speech recognition result for an input speech and a likelihood of the speech as a speech likelihood; an image model generation unit configured to obtain image models of a predetermined number of candidates for the speech recognition result in descending order of speech likelihoods; an image likelihood calculation unit configured to obtain an image likelihood based on an image model of an input image; and an object authentication unit configured to perform object authentication using the image likelihood, wherein the image model generation unit initially performs retrieval from an image model database storing the image models when the image models for the candidates for the speech recognition result are generated and generates an image model from information acquired from a network if the image model is not stored in the image model database, and wherein the image model generation unit determines, in accordance with a previous object authentication history, whether to use the image model stored in the image model database or whether to create and use the image model from the information acquired from the network.

(2) In the above-described aspect (1), the image model generation unit may determine, on the basis of the previous object authentication history, whether to use a local speech model or whether to use the information acquired from the network with respect to a speech model.

(3) In the above-described aspect (1) or (2), the image model generation unit may delete at least one of the image model and an acoustic model for use in speech recognition if an object authentication frequency is less than or equal to a predetermined object authentication frequency.

(4) According to an aspect of the present invention, an object authentication method includes a speech recognition step in which a speech recognition unit obtains candidates for a speech recognition result for an input speech and a likelihood of the speech as a speech likelihood; an image model generation step in which an image model generation unit initially performs retrieval from an image model database storing image models when the image models for the candidates for the speech recognition result are generated, generates an image model from information acquired from a network if the image model is not stored in the image model database, and obtains image models of a predetermined number of candidates for the speech recognition result in descending order of speech likelihoods; an image likelihood calculation step in which an image likelihood calculation unit obtains an image likelihood based on an image model of an input image; an object authentication step in which an object authentication unit performs object authentication using the image likelihood; and a step in which the image model generation unit determines, in accordance with a previous object authentication history, whether to use an image model stored in the image model database or whether to create and use the image model from the information acquired from the network.

According to the above-described aspects (1) and (4), because whether to use a local image model on the basis of a previous history or whether to use an image model on a network is determined and because the number of models to be locally retrieved can be reduced, it is possible to increase a speed of object authentication.

According to the above-described aspect (2), a model (an image model or an acoustic model) with a low utilization frequency is configured to be deleted. Thereby, because the probability of erroneously authenticating an object with a low utilization frequency as a correct authentication result can be reduced, accuracy of authentication can be improved.

According to the above-described aspect (3), because a model (an image model or an acoustic model) with a low utilization frequency is deleted, it is possible to reduce a capacity required for storing a model and it is unnecessary to secure an unnecessary capacity.

BRIEF DESCRIPTION OF THE DRAWINGS

FIG. 2 is a diagram illustrating an example of a utilization frequency and validity/invalidity of saving in a DB according to the present embodiment.

DETAILED DESCRIPTION OF THE INVENTION

Hereinafter, embodiments of the present invention will be described with reference to the drawings.

Figure 1:
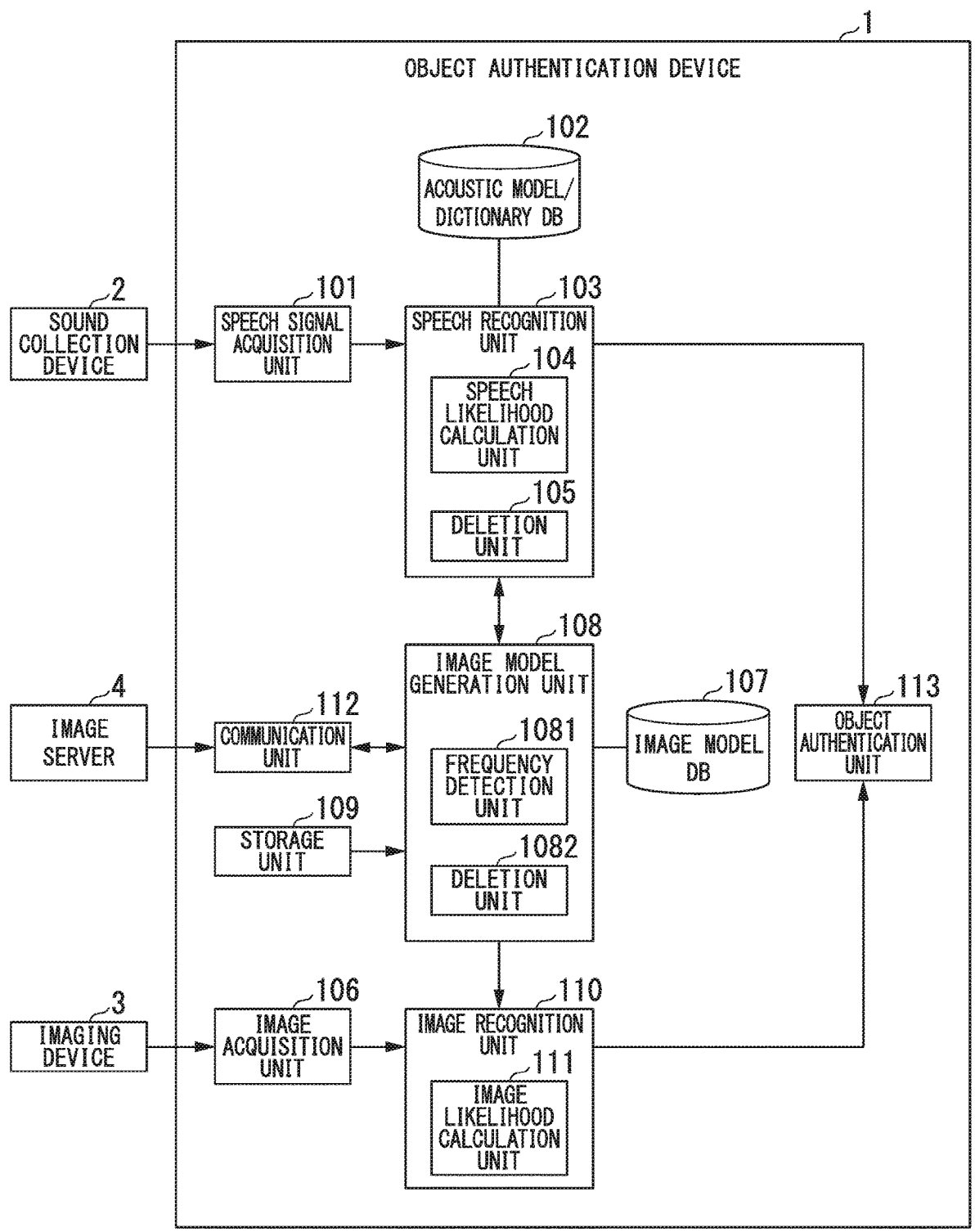
FIG. 1 is a block diagram illustrating an example of a configuration of an object authentication device according to the present embodiment.

FIG. 1 is a block diagram illustrating an example of a configuration of an object authentication device 1 according to the present embodiment. As illustrated in FIG. 1, the object authentication device 1 includes a speech signal acquisition unit 101, an acoustic model/dictionary DB 102, a speech recognition unit 103, an image acquisition unit 106, an image model DB 107, an image model generation unit 108, a storage unit 109, an image recognition unit 110, a communication unit 112, and an object authentication unit 113. Also, the speech recognition unit 103 includes a speech likelihood calculation unit 104 and a deletion unit 105. The image model generation unit 108 includes a frequency detection unit 1081 and a deletion unit 1082. The image recognition unit 110 includes an image likelihood calculation unit 111.

A sound collection device 2 and an imaging device 3 are connected to the object authentication device 1. The object authentication device 1 is connected to an image server 4 via a network.

The sound collection device 2 is, for example, a microphone that collects a signal of a speech spoken by a user, converts the collected speech signal from an analog signal into a digital signal, and outputs the speech signal converted into the digital signal to the object authentication device 1. Also, the sound collection device 2 may be configured to output the speech signal having the analog signal to the object authentication device 1. The sound collection device 2 may be configured to output the speech signal to the object authentication device 1 via a wired cord or a cable, or may be configured to wirelessly transmit the speech signal to the object authentication device 1.

Also, the sound collection device 2 may be a microphone array. In this case, the sound collection device 2 includes P microphones arranged at different positions. Then, the sound collection device 2 generates acoustic signals of P channels (P is an integer of 2 or more) from the collected sound and outputs the generated acoustic signals of the P channels to the object authentication device 1.

The imaging device 3 is, for example, a charged coupled device (CCD) image sensor camera, a complementary metal-oxide-semiconductor (CMOS) image sensor camera, or the like. The imaging device 3 captures an image and outputs the captured image to the object authentication device 1. Also, the imaging device 3 may be configured to output the image to the object authentication device 1 via a wired cord or a cable, or may be configured to wirelessly transmit the image to the object authentication device 1.

The image is stored in the image server 4. Also, resolutions of images may be the same or different. The image server 4 may be an arbitrary site on the Internet. In this case, the object authentication device 1 may be configured to retrieve an image for a candidate recognized by the speech recognition unit 103 from the Internet using a search engine, and acquire, for example, a higher-order image. In this case, the object authentication device 1 may also be configured to acquire a label or a name attached to the image.

The object authentication device 1 recognizes the object using the acquired speech signal and image signal. For example, the object authentication device 1 is incorporated in a humanoid robot, a receiving device, an industrial robot, a smartphone, a tablet terminal, and the like.

Also, if the sound collection device 2 is a microphone array, the object authentication device 1 further includes a sound source localization unit, a sound source separation unit, and a sound source identification unit. In this case, in the object authentication device 1, the sound source localization unit performs sound source localization using a transfer function pre-generated for a speech signal acquired by the speech signal acquisition unit 101. Then, the object authentication device 1 identifies a speaker using a result of the localization by the sound source localization unit. The object authentication device 1 performs sound source separation on the speech signal acquired by the speech signal acquisition unit 101 using the result of the localization by the sound source localization unit. Then, the speech recognition unit 103 of the object authentication device 1 performs utterance section detection and speech recognition on the separated speech signal (see, for example, Japanese Unexamined Patent Application, First Publication No. 2017-9657). Also, the object authentication device 1 may be configured to perform an echo suppression process.

The speech signal acquisition unit 101 acquires a speech signal output by the sound collection device 2 and outputs the acquired speech signal to the speech recognition unit 103. Also, if the acquired speech signal is an analog signal, the speech signal acquisition unit 101 converts the analog signal into a digital signal and outputs the speech signal converted into the digital signal to the speech recognition unit 103.

In the acoustic model/dictionary DB 102, for example, an acoustic model, a language model, a word dictionary, and the like are stored. The acoustic model is a model based on a feature quantity of sound, and the language model is a model of information of words (vocabularies) and an arrangement thereof. The word dictionary is a dictionary based on a large number of vocabularies, for example, a large vocabulary word dictionary.

The speech recognition unit 103 acquires a speech signal output by the speech signal acquisition unit 101 and detects a speech signal of an utterance section from the acquired speech signal. For detection of the utterance section, for example, a speech signal having a predetermined threshold value or more is detected as the utterance section. Also, the speech recognition unit 103 may detect the utterance section using another well-known method. For example, the speech recognition unit 103 extracts a Mel-scale logarithmic spectrum (MSLS), which is an acoustic feature quantity, from a speech signal for each utterance section. Also, the MSLS is obtained using a spectral feature quantity as a feature quantity of acoustic recognition and performing an inverse discrete cosine transform on a Mel-frequency cepstrum coefficient (MFCC). Also, in the present embodiment, for example, the utterance is a word (vocabulary) having a name of an object such as "apple," "motorcycle," or "fork."

The speech likelihood calculation unit 104 calculates a speech likelihood $L_s(s;\Lambda_i)$ using, for example, a hidden Markov model (HMM)), with reference to the acoustic model/dictionary DB 102 with respect to the extracted acoustic feature quantity. Also, the speech likelihood $L_s(s;\Lambda_i)$ is obtained by calculating a posteriori probability $p(\Lambda_i|s)$. Here, s is the acoustic feature quantity and $\Lambda_i$ is a speech model of an $i^{th}$ object stored in the acoustic model/dictionary DB 102. Also, the speech likelihood $L_s$ is a value from 0 to 1. It is indicated that a likelihood difference is larger with respect to a contention candidate and the reliability is higher when the speech likelihood $L_s$ is closer to 1. Also, it is indicated that the reliability is lower when the speech likelihood $L_s$ is closer to 0.

The speech recognition unit 103 determines candidates for a speech recognition result from the top rank of a speech likelihood calculated by the speech likelihood calculation unit 104 to a predetermined rank. As an example, the predetermined rank is a tenth rank. The speech recognition unit 103 outputs the speech likelihood $L_s$ calculated by the speech likelihood calculation unit 104 to the object authentication unit 113.

Reference literature; www.ieice-hbkb.org/files/02/02gun_07hen_02.pdf (retrieved on the web on Mar. 19, 2017), Koichi Shinoda, Akinori Ito, Akinobu Lee, "Group 2 (image, sound, and language)-Volume 7 (speech recognition and synthesis) Chapter 2: speech recognition" ver. 1, the Institute of Electronics, Information and Communication Engineers (IEICE) "Knowledge Base," IEICE, 2010, pp. 2 to 12

The deletion unit 105 deletes an acoustic model of a corresponding word (vocabulary) from the acoustic model/dictionary DB 102 in accordance with a deletion instruction output by the image model generation unit 108. The deletion unit 105 outputs the acoustic model to be deleted to the image model generation unit 108.

The image acquisition unit 106 acquires an image output by the imaging device 3 and outputs the acquired image to the image recognition unit 110.

In the image model DB 107, an image model is stored. Also, an image model name (an object name) is assigned to the image model. The image model is a model based on a feature quantity of the image. Also, the image model DB 107 may store images. In this case, it is preferable for resolutions of images to be the same. When the resolutions are different, the image model generation unit 108 generates an image model by normalizing the resolutions.

The image model generation unit 108 retrieves whether or not image models of candidates for the speech recognition result from the top rank of the speech likelihood output by the speech recognition unit 103 to the predetermined rank are stored in the image model DB 107 using the candidates for the speech recognition result from the top rank of the speech likelihood to the predetermined rank.

If image models of candidates for a speech recognition result are stored in the image model DB 107, the image model generation unit 108 acquires a corresponding image model from the image model DB 107.

If the image models of the candidates for the speech recognition result are not stored in the image model DB 107, the image model generation unit 108 acquires images corresponding to the candidates for the speech recognition result from the image server 4 or the network (the Internet) using a uniform resource locator (URL) address stored in the storage unit 109 to control the communication unit 112. Also, the URL address accessed by the communication unit 112 may be stored in the image model generation unit 108 or the communication unit 112. More specifically, if an image model of "glass beads" is not stored in the image model DB 107, the image model generation unit 108 acquires at least one image of "glass beads." Also, the image model generation unit 108 may be configured to acquire a resolution of the acquired image and normalize the acquired resolution when the acquired resolution is different from a predetermined value. The image model generation unit 108 extracts a feature quantity of the acquired image and generates an image model using the extracted feature quantity. A method of generating an image model using an image acquired from the image server 4 or the network (the Internet) will be described below with reference to FIG. 5.

The image model generation unit 108 outputs the image model acquired from the image model DB 107 or the generated image model to the image recognition unit 110 in descending order of speech likelihoods.

In the image recognition process, the frequency detection unit 1081 detects the number of times the image model is used (adopted) and causes the image model DB 107 to store the detected number of times in association with the image model name (the object name). Also, the frequency detection unit 1081 may be configured to cause the storage unit 109 to store the detected number of times in association with the image model name (the object name).

The deletion unit 1082 saves an image model for which the number of uses is greater than the predetermined number of times (for example, 5) in the image recognition process and determines to delete an image model for which the number of uses is less than or equal to the predetermined number of times. The deletion unit 1082 deletes a corresponding image model from the image model DB 107. The deletion unit 1082 causes the image server 4 to store the deleted image model via the communication unit 112. The deletion unit 1082 outputs a deletion instruction for deleting a word (a vocabulary or an object name) corresponding to the image model to be deleted to the deletion unit 105 of the speech recognition unit 103. The deletion unit 1082 causes the image server 4 to store an acoustic model output by the deletion unit 105 of the speech recognition unit 103 via the communication unit 112.

Also, the acoustic model/dictionary DB 102 may save information indicating the deletion and movement to the image server 4.

Also, the image model generation unit 108 may be configured to acquire a speech signal from the network, calculate a feature quantity from the acquired speech signal, and generate an acoustic model.

The storage unit 109 stores a URL address of the image server 4.

The image recognition unit 110 calculates an image feature quantity of an image output by the imaging device 3. Also, the image feature quantity may be, for example, at least one of a wavelet for the entire target object, a scale-invariant feature transform (SIFT) feature quantity or a speeded up robust features (SURF) feature quantity for local information of the target object, Joint HOG, which is a joint of local information, and the like. Also, the image recognition unit 110 may be configured to calculate an image feature quantity for an image obtained by performing horizontal inversion on the image output by the imaging device 3.

The image likelihood calculation unit 111 calculates an image likelihood $L_v(v;o_i)$ for each candidate using the calculated image feature quantity and the image models output by the image model generation unit 108, for example, the HMM. Also, the image likelihood $L_v(v;o_i)$ is obtained by calculating a posterior probability $p(o_i|v)$. Here, v is an image feature quantity, and $o_i$ is an image model of an $i^{th}$ object output by the image model generation unit 108. Also, the image likelihood $L_v$ is a value from 0 to 1. It is indicated that a likelihood difference is larger with respect to a contention candidate and the reliability is higher when the image likelihood $L_v$ is closer to 1. Also, it is indicated that the reliability is lower when the image likelihood $L_v$ is closer to 0.

The image recognition unit 110 determines candidates for an image recognition result from the top rank of a likelihood calculated by the image likelihood calculation unit 111 to a predetermined rank. As an example, the predetermined rank is a tenth rank. The image recognition unit 110 outputs the image likelihood $L_v$ calculated by the image likelihood calculation unit 111 to the object authentication unit 113.

In accordance with control of the image model generation unit 108, the communication unit 112 accesses the image server 4 or the network (the Internet) and acquires an image.

Using the speech likelihood $L_s$ output by the speech recognition unit 103 and the image likelihood $L_v$ output by the image recognition unit 110, the object authentication unit 113 performs integration according to a logistic function of the following Equation (1) to obtain an object likelihood $F_L$ for each candidate.

$$F_L(L_s, L_v) = \frac{1}{1 + e^{-(\alpha_0 + \alpha_1 L_s + \alpha_2 L_v)}} \quad (1)$$

In Equation (1), v is an input image, $o_i$ is an $i^{th}$ image model, and $\alpha_0$, $\alpha_1$, and $\alpha_2$ are parameters of the logistic function.

The object authentication unit 113 estimates a candidate $\hat{i}$ having a maximum object likelihood $F_L$ calculated using the following Equation (2).

$$\hat{i} = \arg\max_i F_L(L_s(s; \Lambda_i), L_v(v; o_i)) \quad (2)$$

Also, in Equation (2), arg max $F_L( \ldots )$ is a function for providing $F_L$ that maximizes . . . .

Also, although an example in which the speech likelihood $L_s$ and the image likelihood $L_v$ are integrated using a logistic function has been described in the above-described example, the present invention is not limited thereto. They may be integrated using other functions.

Here, an outline of the SIFT feature quantity will be described.

A process of the SIFT is roughly divided into two steps of detection of feature points and description of feature quantities. In the detection of feature points, a point considered as an image feature (a key point) is determined from a difference between smoothed images with different scales. Then, information is described using the gradient information of a surrounding image around each key point. Next, by calculating a difference between the scales, a position of appearance of a change in the image (a boundary between an object and a background or the like) is calculated. A point at which this change is maximized is a candidate for a feature point (a key point) of the SIFT. In order to retrieve this point, differential images are arranged and extreme values are retrieved. The SIFT feature is obtained by describing an image gradient around this key point.

Next, an example of a utilization frequency and validity/invalidity of saving in a DB (the acoustic model/dictionary DB 102 and the image model DB 107) will be described.

FIG. 2 is a diagram illustrating an example of a utilization frequency and validity/invalidity of saving in a DB according to the present embodiment.

As illustrated in FIG. 2, the frequency detection unit 1081 causes the image model DB 107 to store the number of times an image model is used during an image recognition process for each image model name (object name).

In the example illustrated in FIG. 2, the number of times an image model name "strawberry" is used is 10, the number of times an image model name "lemon" is used is 8, and the number of times an image model name "truck" is used is 3. The deletion unit 1082 saves an image model for which the number of uses is greater than or equal to the predetermined number of times (for example, 5) and determines to delete an image model for which the number of uses is less than the predetermined number of times. In the example illustrated in FIG. 2, the deletion unit 1082 determines to delete the image model of the image model name "truck" whose number of uses is less than 5 from the image model DB 107.

Next, an example of a processing procedure performed by the object authentication device 1 will be described.

Figure 3:
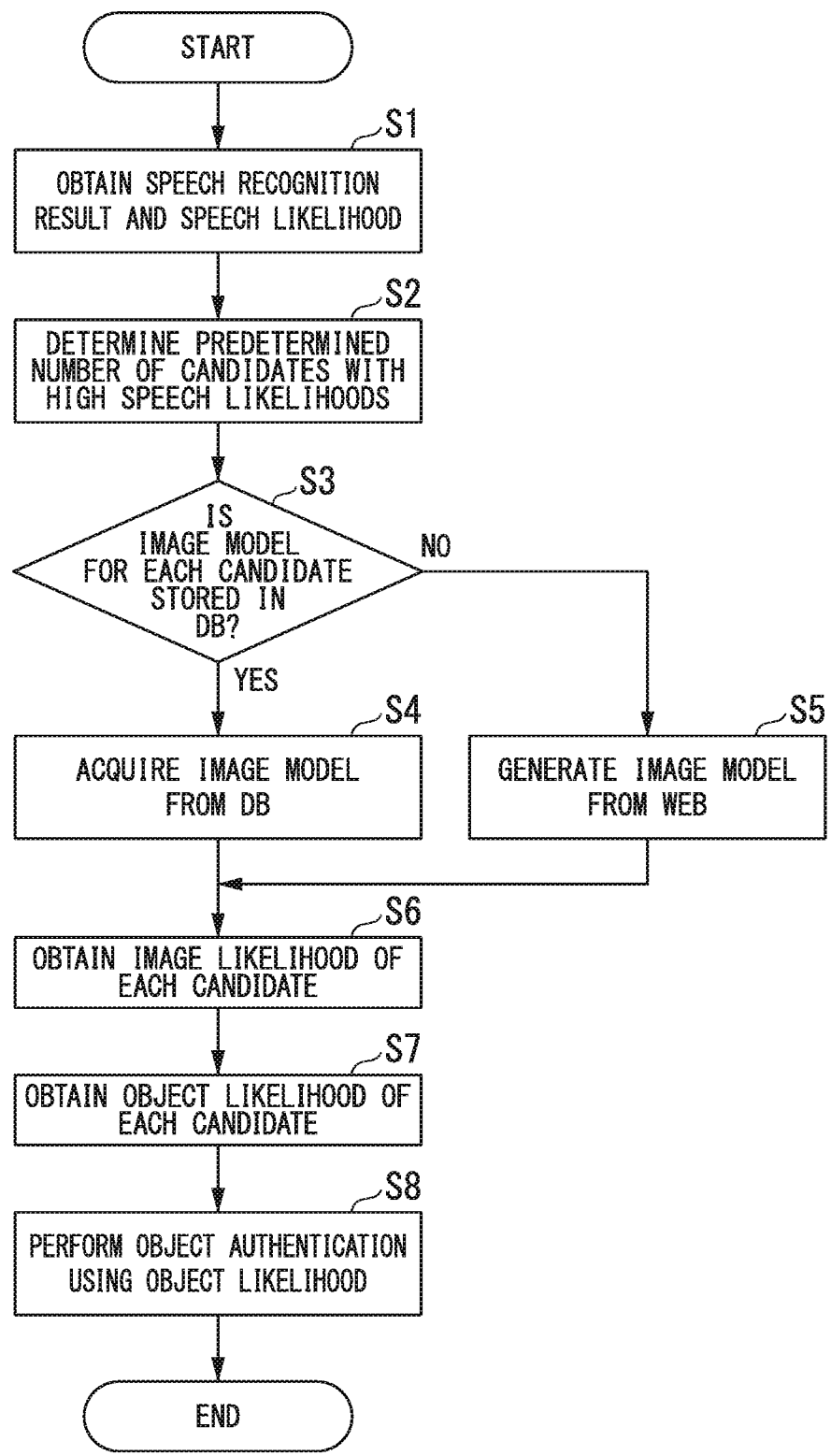
FIG. 3 is a flowchart illustrating an example of a processing procedure of object authentication performed by the object authentication device according to the present embodiment.

FIG. 3 is a flowchart illustrating an example of a processing procedure of object authentication by the object authentication device 1 according to the present embodiment.

(Step S1) The speech recognition unit 103 extracts an acoustic feature quantity from a speech signal acquired by the speech signal acquisition unit 101 from the sound collection device 2. Subsequently, the speech recognition unit 103 calculates a speech likelihood $L_s(s;\Lambda_i)$ using, for example, an HMM, with reference to the acoustic model/dictionary DB 102 with respect to the extracted acoustic feature quantity.

(Step S2) The speech recognition unit 103 determines candidates for a speech recognition result from the top rank of a likelihood calculated by the speech likelihood calculation unit 104 to a predetermined rank.

(Step S3) The image model generation unit 108 determines whether or not image models of candidates for the speech recognition result from the top rank of the speech likelihood output by the speech recognition unit 103 to the predetermined rank are stored in the image model DB 107 using the candidates for the speech recognition result from the top rank of the speech likelihood to the predetermined rank. If it is determined that the image models for the candidates for the speech recognition result are stored in the image model DB 107 (step S3; YES), the image model generation unit 108 moves the process to step S4. If it is determined that the image models for the candidates for the speech recognition result are not stored in the image model DB 107 (step S3; NO), the image model generation unit 108 moves the process to step S5.

(Step S4) The image model generation unit 108 acquires corresponding image models from the image model DB 107. The image model generation unit 108 outputs the acquired image models to the image recognition unit 110 in descending order of likelihoods and moves the process to step S6.

(Step S5) The image model generation unit 108 acquires images corresponding to the candidates for the speech recognition result from the image server 4 or the network (the web: World Wide Web) by controlling the communication unit 112 with the URL address stored in the storage unit 109. The image model generation unit 108 generates image models from the acquired images, outputs the generated image models to the image recognition unit 110 in descending order of likelihoods, and moves the process to step S6.

(Step S6) The image likelihood calculation unit 111 calculates an image likelihood $L_v(v;o_t)$ for each candidate using the calculated image feature quantity and the image models output by the image model generation unit 108, for example, the HMM.

(Step S7) Using the speech likelihood $L_s$ output by the speech recognition unit 103 and the image likelihood $L_v$ output by the image recognition unit 110, the object authentication unit 113 performs integration according to a logistic function of the above-described Equation (1) to obtain an object likelihood $F_L$ for each candidate.

(Step S8) The object authentication unit 113 recognizes an object by obtaining a candidate for which the object likelihood $F_L$ calculated using the above-described Equation (2) becomes maximum.

Accordingly, the process of object authentication of the object authentication device 1 is completed.

Next, an example of a processing procedure of deleting an image model will be described.

Figure 4:
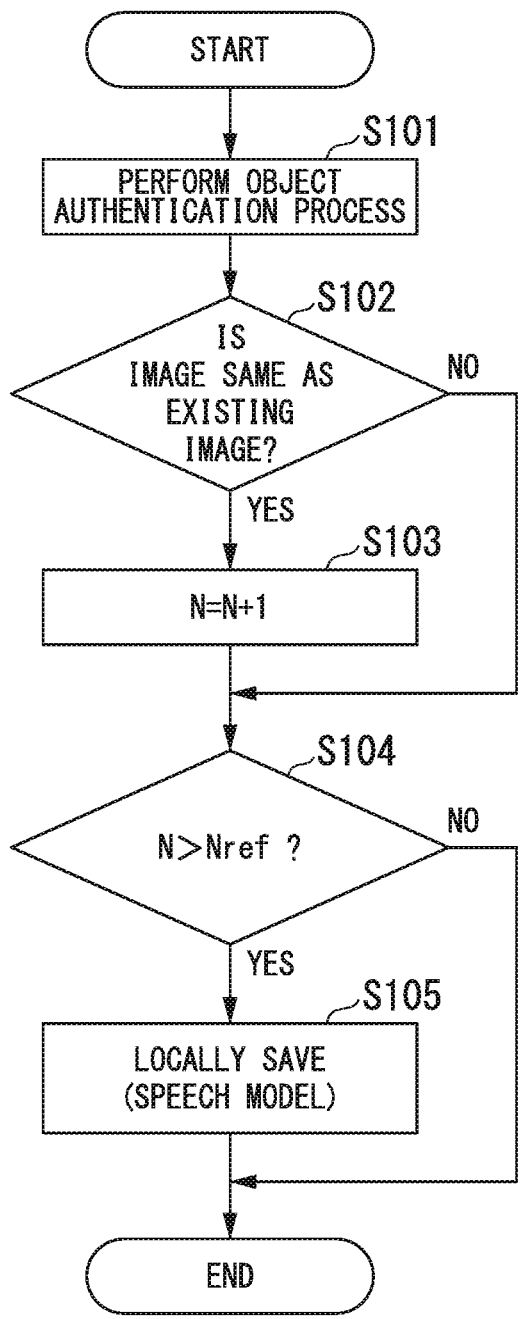
FIG. 4 is a flowchart illustrating an example of a processing procedure of deleting an image model according to the present embodiment.

FIG. 4 is a flowchart illustrating an example of a processing procedure of deleting an image model according to the present embodiment.

(Step S101) The object authentication device 1 performs the object authentication process illustrated in FIG. 3.

(Step S102) After the authentication process, the frequency detection unit 1081 determines whether an image used for current authentication is an image model stored in the image model DB 107. If it is determined that the image used for the current authentication is an image model stored in the image model DB 107 (step S102; YES), the frequency detection unit 1081 determines that the image is the same as an existing image and proceeds to the processing of step S103. If it is determined that the image used for the current authentication is not an image model stored in the image model DB 107 (step S102; NO), the frequency detection unit 1081 determines that the image is not the same as an existing image and proceeds to the processing of step S104.

(Step S103) The frequency detection unit 1081 adds 1 to a count value N for frequency counting (N=N+1). The frequency detection unit 1081 proceeds to the processing of step S104.

(Step S104) The deletion unit 1082 determines whether or not N is greater than a threshold value Nref. If it is determined that N is greater than the threshold value Nref (step S104; YES), the deletion unit 1082 proceeds to the processing of step S105. If the deletion unit 1082 determines that N is less than the threshold value Nref (step S104; NO), the deletion unit 1082 terminates the process.

(Step S105) The deletion unit 1082 deletes a corresponding image model from the image model DB 107. Subsequently, the deletion unit 1082 causes the image server 4 to store the deleted image model via the communication unit 112. Subsequently, the deletion unit 1082 outputs a deletion instruction for deleting a word (a vocabulary or an object name) corresponding to the image model to be deleted to the deletion unit 105 of the speech recognition unit 103. Subsequently, the deletion unit 105 deletes an acoustic model of the corresponding word (vocabulary) from the acoustic model/dictionary DB 102 in accordance with the deletion instruction output by the image model generation unit 108. Subsequently, the deletion unit 105 outputs the acoustic model to be deleted to the image model generation unit 108. Subsequently, the acoustic model output by the deletion unit 105 of the speech recognition unit 103 is stored in the image server 4 via the communication unit 112.

That is, in accordance with a previous object authentication history, the object authentication device 1 of the present embodiment determines whether to use an image model stored in the image model DB 107 or create and use an image model from the information acquired from the network, and selects an image model which is stored in the image model DB 107.

Next, an example of a processing procedure of generating an image model by acquiring an image from the image server 4 will be described.

Figure 5:
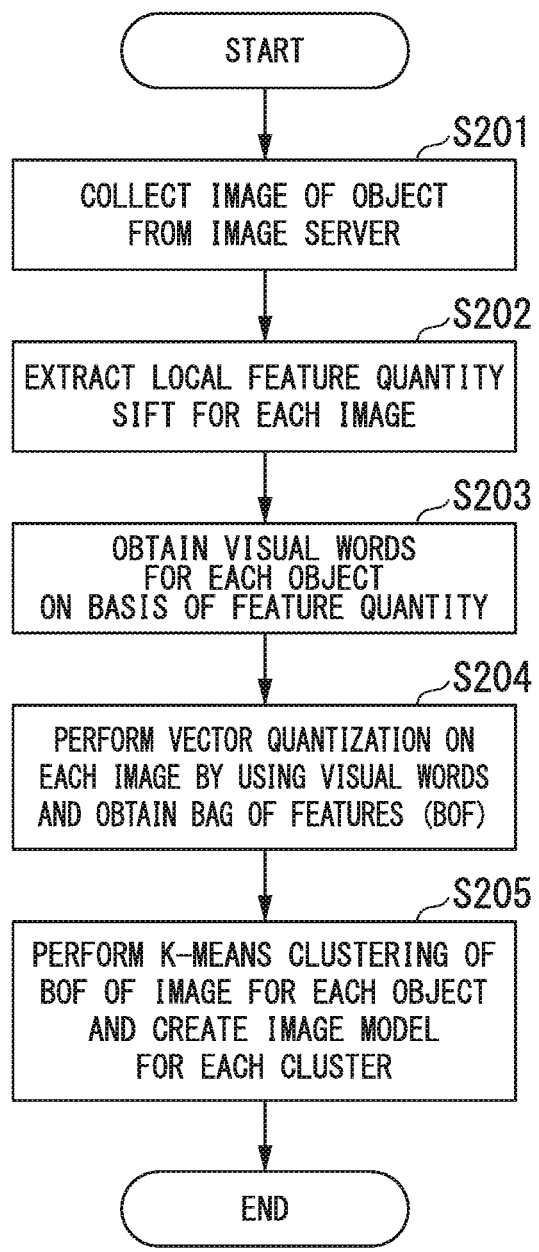
FIG. 5 is a flowchart illustrating an example of a processing procedure of acquiring an image from an image server and generating an image model according to the present embodiment.

FIG. 5 is a flowchart illustrating an example of a processing procedure for acquiring an image from the image server 4 and generating an image model according to the present embodiment.

(Step S201) The image model generation unit 108 acquires (collects) images of objects corresponding to candidates for a recognition result from the image server 4.

(Step S202) For example, the image model generation unit 108 extracts an SIFT feature quantity for an image of each of the candidates.

(Step S203) The image model generation unit 108 obtains visual words for each object on the basis of the SIFT feature quantity. Here, the visual words will be described. For example, in a bag of features (BoF), SIFT features and SURF features are extracted from images of objects and are classified into W clusters according to a k-means method. A vector serving as the centroid (the center of gravity) of each cluster is referred to as a visual word and the number thereof is determined empirically. Specifically, the image model generation unit 108 executes k-means clustering (a K average method) of SIFT feature quantities of all images, and sets centers of clusters as the visual words. Also, the visual words correspond to a typical local pattern.

(Step S204) The image model generation unit 108 performs vector quantization on each candidate image using the visual words to obtain a BoF representation of each image. The BoF representation represents an image according to appearance frequencies (histograms) of the visual words.

(Step S205) The image model generation unit 108 performs k-means clustering of the BoF for each object of a recognition candidate and generates an image model for each cluster.

Although an example in which the image model generation unit 108 acquires an image from the image server 4 to generate an image model when an image of a candidate for a speech recognition result is not stored in the image model DB 107 has been described in the above-described example, the present invention is not limited thereto. The image model generation unit 108 may be configured to acquire an image from the image server 4 even when an image of a candidate for a speech recognition result is stored in the image model DB 107. In this case, the image model generation unit 108 may be configured to generate a second image model for a second image acquired from the image server 4. The image model generation unit 108 may be configured to output a first image model acquired from the image model DB 107 and the generated second image model to the image recognition unit 110. Then, the image likelihood calculation unit 111 may be configured to calculate image likelihoods of the first image model and the generated second image model and select the image model having a higher image likelihood.

As described above, in the present embodiment, with respect to speech information and image information, a determination is performed from previously used history information, images that are frequently used are in a local region (the acoustic model/dictionary DB 102 and the image model DB 107), and other images are retrieved from the network. Also, in the present embodiment, images that are rarely used are deleted from a local region.

Thereby, according to the present embodiment, because whether to use a local image model on the basis of a previous history or whether to use an image model on the network is determined and because it is possible to reduce the number of models to be locally retrieved, it is possible to increase an object authentication speed.

Also, according to the present embodiment, a model (an image model or an acoustic model) with a low utilization frequency is deleted. Thereby, because the probability of erroneously authenticating an object with a low utilization frequency as a correct authentication result is reduced, accuracy of authentication can be improved.

Also, according to the present embodiment, because a model (an image model or an acoustic model) with a low utilization frequency is deleted, it is possible to reduce a capacity required for storing a model and it is unnecessary to secure an unnecessary capacity.

Although an example in which the sound collection device 2 and the imaging device 3 are connected to the object authentication device 1 has been described in the above-described example, the sound collection device 2 and the imaging device 3 may be provided in the object authentication device 1.

Also, all or a part of processing to be performed by the object authentication device 1 may be performed by recording a program for implementing all or some of the functions of the object authentication device 1 according to the present invention on a computer-readable recording medium and causing a computer system to read and execute the program recorded on the recording medium. Also, the "computer system" used here is assumed to include an operating system (OS) and hardware such as peripheral devices. In addition, the computer system is assumed to include a homepage providing environment (or displaying environment) when a World Wide Web (WWW) system is used. In addition, the computer-readable recording medium refers to a storage device, including a flexible disk, a magneto-optical disc, a read only memory (ROM), a portable medium such as a compact disc (CD)-ROM, and a hard disk embedded in the computer system. Further, the "computer-readable recording medium" is assumed to include a computer-readable recording medium for holding the program for a predetermined time as in a volatile memory (a random access memory (RAM)) inside the computer system including a server and a client when the program is transmitted via a network such as the Internet or a communication circuit such as a telephone circuit.

Also, the above-described program may be transmitted from a computer system storing the program in a storage device or the like via a transmission medium or transmitted to another computer system by transmission waves in a transmission medium. Here, the "transmission medium" for transmitting the program refers to a medium having a function of transmitting information, such as a network (a communication network) like the Internet or a communication circuit (a communication line) like a telephone circuit. Also, the above-described program may be a program for implementing some of the above-described functions. Further, the above-described program may be a program capable of implementing the above-described function in combination with a program already recorded on the computer system, i.e., a so-called differential file (differential program).

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An object authentication device, comprising:
a computer system configured to read and execute a program recorded on a computer-readable recording medium, causing the computer system to function as:
a speech recognition unit configured to obtain candidates for a speech recognition result for an input speech and a likelihood of the speech as a speech likelihood;
an image model generation unit configured to obtain image models of a predetermined number of candidates for the speech recognition result in descending order of speech likelihoods;
an image likelihood calculation unit configured to obtain an image likelihood based on an image model of an input image; and
an object authentication unit configured to perform object authentication using the image likelihood,
wherein the image model generation unit initially performs retrieval from an image model database storing the image models when the image models for the candidates for the speech recognition result are generated, and generates an image model from information acquired from a network if the image model is not stored in the image model database,
wherein the image model generation unit determines, in accordance with a previous object authentication history, whether to use the image model stored in the image model database or whether to create and use the image model from the information acquired from the network, and
wherein the image model generation unit detects a number of times the image model is used, causes the image model database to store the detected number of times in association with an image model name, saves the image model for which the detected number of times is greater than a predetermined number of times in the object authentication, and deletes the image model for which the detected number of times is less than or equal to the predetermined number of times.

2. The object authentication device according to claim 1, wherein the image model generation unit determines, on the basis of the previous object authentication history, whether to use a local speech model or whether to use the information acquired from the network with respect to a speech model.

3. An object authentication method, comprising:

a speech recognition step in which a speech recognition unit obtains candidates for a speech recognition result for an input speech and a likelihood of the speech as a speech likelihood;

an image model generation step in which an image model generation unit initially performs retrieval from an image model database storing image models when the image models for the candidates for the speech recognition result are generated, generates an image model from information acquired from a network if the image model is not stored in the image model database, and obtains image models of a predetermined number of candidates for the speech recognition result in descending order of speech likelihoods;

an image likelihood calculation step in which an image likelihood calculation unit obtains an image likelihood based on an image model of an input image;

an object authentication step in which an object authentication unit performs object authentication using the image likelihood;

a step in which the image model generation unit determines, in accordance with a previous object authentication history, whether to use an image model stored in the image model database or whether to create and use the image model from the information acquired from the network; and a step in which the image model generation unit detects a number of times the image model is used, causes the image model database to store the detected number of times in association with an image model name, saves the image model for which the detected number of times is greater than a predetermined number of times in the object authentication, and deletes the image model for which the detected number of times is less than or equal to the predetermined number of times.

* * * * *